United States Patent
Real

(12) 
(10) Patent No.: US 6,267,496 B1
(45) Date of Patent: *Jul. 31, 2001

(54) BEVERAGE SUPPLY APPARATUS FOR DISPENSING MACHINE

(76) Inventor: Bryan Real, 4970 Rochester St., Barrington, IL (US) 60010

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,770

(22) Filed: Dec. 3, 1998

(51) Int. Cl.$^7$ .............................. B01F 15/02; B67D 5/08
(52) U.S. Cl. .................. 366/132; 366/152.6; 366/154.1; 222/56
(58) Field of Search .............................. 366/151.1, 152.6, 366/153.1, 154.1, 155.1, 165.1, 165.3, 165.4, 181.1, 182.1, 131, 132; 99/287, 305; 222/56, 51, 148, 64; 134/93

(56) References Cited

U.S. PATENT DOCUMENTS

| Re. 25,892 | * | 11/1965 | Tarukawa | 366/152.6 |
|---|---|---|---|---|
| D. 229,897 | | 1/1974 | Martin . | |
| D. 274,114 | | 6/1984 | Cleland . | |
| D. 276,785 | | 12/1984 | Cleland . | |
| 2,682,976 | | 7/1954 | Melikian et al. | 222/108 |
| 2,900,176 | * | 8/1959 | Krogel | 366/152.6 |
| 3,108,718 | | 10/1963 | Seener | 222/129.1 |
| 3,196,627 | | 7/1965 | Swenson | 62/136 |
| 3,253,741 | * | 5/1966 | Russell et al. . | |
| 3,266,670 | | 8/1966 | Brooks et al. . | |
| 3,385,569 | | 5/1968 | Bookout | 259/60 |
| 3,403,825 | | 10/1968 | Modjeski . | |
| 3,521,791 | | 7/1970 | Freise et al. | 222/64 |

(List continued on next page.)

FOREIGN PATENT DOCUMENTS 2459622  11/1975 (DE) .
2069458   8/1981 (GB) .

OTHER PUBLICATIONS

Componenti Catalog, 1997 Edition; Distributed by Vending Equipment Sales, Inc; Various Pages.

SPM Granita Machine Operation and Instruction Manual; Grindmaster Corporation, 1998.

*Primary Examiner*—Tony G. Soohoo
(74) *Attorney, Agent, or Firm*—Price, Heneveld, Coop Dewitt & Litton

(57) ABSTRACT

A beverage supply apparatus for placement atop a beverage dispenser bowl comprises a housing, a mounting flange and a hopper within the housing for storing dry beverage powder mix. The hopper holds a quantity of powder beverage mix and dispenses powder mix from the hopper through an outlet. A whipping chamber disposed between and in communication with the hopper outlet and the bowl has a mechanical impeller contained therein. A water supply line is in selective communication with the whipping chamber via a water control valve. A probe measures the quantity of mixed beverage in the bowl, where a control circuit automatically activates the hopper agitator, opens the water control valve and activates the mechanical impeller in the whipping chamber when sensing a quantity of mixed beverage in the bowl below a predetermined quantity. The mix and water is substantially completely mixed into a homogenous beverage mixture having a predetermined consistency prior to passage of the beverage mixture to the bowl. This mixing process occurs until the quantity of mixed beverage in the bowl rises to a predetermined quantity. A magazine of sanitizing tablets arranged in a stack is also provided on the housing proximate a sanitizing tablet opening extending through the housing for allowing sanitizing tablets to automatically pass into the bowl.

4 Claims, 7 Drawing Sheets

U.S. PATENT DOCUMENTS

| | | |
|---|---|---|
| 3,568,887 | 3/1971 | Jacobs et al. .......................... 222/70 |
| 3,643,835 | 2/1972 | Popinski . |
| 3,876,107 | 4/1975 | Meindl et al. ........................ 222/64 |
| 3,915,341 | 10/1975 | Brown . |
| 3,976,222 * | 8/1976 | Spagnolo .............................. 222/70 |
| 4,042,151 * | 8/1977 | Uttech ............................... 222/129.2 |
| 4,129,230 * | 12/1978 | Billett et al. ........................ 221/268 |
| 4,160,512 | 7/1979 | Cleland . |
| 4,280,401 | 7/1981 | Cleland . |
| 4,300,442 | 11/1981 | Martin . |
| 4,364,666 | 12/1982 | Keyes . |
| 4,366,920 | 1/1983 | Greenfield, Jr. et al. . |
| 4,461,405 | 7/1984 | Adamson . |
| 4,469,137 | 9/1984 | Cleland . |
| 4,488,664 | 12/1984 | Cleland ................................. 222/56 |
| 4,493,249 | 1/1985 | Stover . |
| 4,538,636 | 9/1985 | Cleland . |
| 4,544,084 | 10/1985 | Cleland . |
| 4,566,287 * | 1/1986 | Schmidt et al. .................. 222/129.3 |
| 4,610,378 | 9/1986 | Grossi . |
| 4,653,281 | 3/1987 | Van Der Veer ...................... 366/144 |
| 4,706,473 | 11/1987 | Cipelletti . |
| 4,718,579 | 1/1988 | Brody et al. . |
| 4,736,593 | 4/1988 | Williams . |
| 4,850,515 | 7/1989 | Cleland ................................. 222/56 |
| 4,869,072 | 9/1989 | Sexton et al. . |
| 4,922,725 | 5/1990 | Rasmussen . |
| 5,056,686 * | 10/1991 | Jarrett ............................... 222/129.2 |
| 5,570,816 | 11/1996 | LaBarbera, Jr. . |
| 5,588,557 * | 12/1996 | Topar ..................................... 222/54 |
| 5,757,667 | 5/1998 | Shannon et al. . |
| 5,931,343 * | 8/1999 | Topar et al. .......................... 222/64 |
| 5,975,357 * | 11/1999 | Topar ..................................... 222/64 |

* cited by examiner

BEVERAGE SUPPLY APPARATUS FOR DISPENSING MACHINE

FIELD OF THE INVENTION

The present disclosure relates to an improved apparatus for supplying a mixing beverage to an iced beverage dispensing machine. More particularly, the present disclosure teaches an improved apparatus for mounting upon an iced beverage dispenser that automatically supplies a substantially mixed beverage into the bowl of the ice beverage dispenser by combining a metered amount of dry powder with a predetermined volume of liquid, such as water, into a homogenous solution and automatically cleans the bowl upon completion of use.

BACKGROUND OF THE INVENTION

Iced beverage dispensers have long been used to dispense a cold, frozen or slushy beverage into consumer's cups. They are typically found in self-service applications, such convenience stores, and in full-service applications, such as restaurants. Such iced beverage dispensers typically include a bowl for storing a quantity of mixed beverage, where the bowl has an upper lip to which is attached a cover, which is often illuminated and illustrated to serve a merchandising function. The iced beverage dispenser is provided with a beverage dispensing valve for drawing the beverage into a customer's cup. An auger typically maintains the beverage within the bowl in a mixed homogenous state. Particularly in the case of frozen or slushy beverages, the auger is often combined with a cooling element, such as an evaporator coil, connected to a mechanical refrigeration system to withdraw heat from the beverage and obtain and maintain its cold temperature.

In the usual operation of such iced beverage dispensers, the unit has been manually cleaned from its previous use. A measured quantity of dry beverage powder is added to a separate container, diluted with water and mixed according to the manufacturer's directions in the separate container. Once mixed, the typically 1 to 3 gallons of beverage is poured over the upper lip and into the bowl. The mechanical refrigeration system of the machine is then engaged and the beverage begins to chill. Once at the desired temperature, the beverage behavior changes from liquid to granular in flowability and mixability. For iced or slushy drinks, where the desired temperature is 28° F., this process can take over 40 minutes. It is therefore important that the mixing and chilling operations occur significantly before the first beverage draw is expected.

As beverage is drawn from the bowl through the dispensing valve, the level of the beverage in bowl drops. When the level drops to a predetermined level, the employee attending the beverage dispenser must pour in another 1 to 2 gallons of beverage premixed as described above. While generally satisfactory in maintaining the mass of available beverage at sufficient levels, such practices require a 40 minute wait before the beverage is properly chilled and causes lack of available beverage, particularly during peak demand times, such as during the lunch hours, where employee attention is directed elsewhere. Lack of beverage directly results in lost sales and revenue. Although this waiting time could be reduced by adding less premixed beverage more frequently, it is often impractical for employees to do so, particularly in self-service applications.

There have been efforts to overcome these difficulties. For example, U.S. Pat. No. 4,488,664 to Cleland discloses an attachment unit for engaging an open supply tank of a beverage dispenser. The unit teaches mixing together quantities of powdered beverage concentrate and water for delivery to the tank when the tank level lowers to a predetermined low level and until the level rises to a predetermined high level. To mix the concentrate and water, Cleland teaches use of a mixing chamber defined by a conical funnel into which a water discharge tube is tangentially disposed at an upper end portion to cause vortex flow in the chamber.

While generally satisfactory for beverage powder mix containing primarily sugars and flavorings that mix immediately, such as fruit drinks, the mixing chamber taught by Cleland does not satisfactory mix all powder beverage mixes, particularly those powder beverage mixes containing high concentrations of fatty solids, such as cappuccino and hot cocoa mixes. This drawback becomes especially pronounced where cold water only must be mixed with powder beverage mixes containing fatty solids. Cold water is used due to the desirability of cooling the mixture to below-freezing temperatures as soon as possible. The effect is very poor mixing and agglomerations of powder mix floating in the water. As the components remain unmixed even after passing to the bowl, the result is obviously unsatisfactory. Not only is the newly added powder beverage mix and liquid not mixed, effecting the taste of the beverage, the appearance of apparent debris floating on top of the preexisting beverage in the bowl is visually and aesthetically unappealing, resulting in lost sales and revenue.

Possibly more serious is the risk of physical damage to the auger and evaporator in the bowl if the beverage mix and liquid is not substantially completely mixed. This is due to the fact that substantially mixing the beverage mix containing relatively high concentrations of fatty solids with water lowers the freezing point of the water. Lowering the freezing point in turn prevents the water from prematurely freezing into ice particles large enough to jam or otherwise interfere with the operation of the auger, which tends to be damaged by such interference. Where the beverage mix and water are substantially completely mixed, this problem is avoided, as only relatively small particles of ice can form, particles that are relatively harmless to the machine.

To overcome these drawbacks associated with high fat content powder mixes, recent efforts have focused on using so-called "bag in the box" systems. Such systems generally include a mixing chamber as used by Cleland, consisting generally of a conical cup into which a water stream enters tangentially. A liquid, such as tap water, is mixed with a liquid beverage concentrate or syrup supplied from the manufacturer in a plastic or mylar bag enclosed within a cardboard box. Since the beverage "mix" is already in the liquid state, the problem of poor mixing and agglomeration is overcome. However, such systems require elaborate and expensive supply systems to pump or extract the liquid beverage concentrate from the bag and deliver it to the mixing apparatus.

Moreover, it is not uncommon that the sanitary seal of the bag is compromised during connection to the supply systems, resulting in spilling and contamination of the contains of the bag. If proper pH levels are not maintained in a liquid product, *E-coli* and other bacteria begin to form. Also, once opened, the entire contents of the bag must remain connected to the supply system and beverage dispenser. One or more containers of the "bag in the box" systems also often rupture during shipping, resulting in contamination of virtually an entire skid of such products. Powder mix does not share these drawbacks, and coupled with its significantly cheaper cost per unit of mixed beverage, it would be advantageous to improve and broaden the use of powder mixes.

There have also been long standing problems with cleaning the bowls of iced beverage dispensers after use. The current recommended practice of manufacturers is that the beverage dispenser be cleaned every evening. The refrigeration systems are turned off and the beverage is drained from the bowl. Optionally, hot water is used to fill the bowl to melt off any sugar deposits and is then drained. The bowl auger is removed and the bowl is removed from the machine. Each piece, both removed and remaining in place, is then thoroughly washed with warm water and a mild dishwashing detergent and rinsed. The machine is then reassembled.

The most severe problem is the time required to clean such units every day. Also, the disassembly process requires the manipulation of fasteners, increasing the prospects for their loss or misplacement. Finally, repeated disassembly and assembly only increases the chances of damage and breakage to the components, particularly to the plastic bowl, which easily cracks and which if damaged renders the entire unit inoperative.

Accordingly, to provide a solution to these problems, it is desirable that there be a beverage supply apparatus that can readily and automatically supply an iced beverage dispenser with a relatively constant and substantially completely homogeneously mixed and chilled iced beverage having a relatively high fatty solid content in the shortest possible time. It is further desirable that such a supply apparatus be capable of offering a sanitizing function to reduce the frequency of disassembly and reassembly, with their associated drawbacks.

In sum, an apparatus for automatically supplying a substantially mixed homogenous beverage to a beverage dispenser and sanitizing the same was needed.

SUMMARY OF THE INVENTION

To overcome these and other disadvantages of the prior art, the present disclosure, briefly described, provides, in general form, an apparatus for automatically supplying a substantially mixed homogenous beverage to a beverage dispenser. The beverage dispenser has a bowl for storing a quantity of mixed beverage, a beverage dispensing valve and an auger for maintaining the beverage within the bowl in a mixed homogenous state.

The supply apparatus, ideally suited to sit atop the beverage dispenser bowl as an optional or after-market device, comprises a housing, a mounting flange and a hopper within the housing for storing dry beverage powder mix. The hopper has an upper opening for readily admitting powder mix into the hopper, for example, by an employee, an outlet for dispensing powder mix from the hopper and an auger for selectively feeding a metered quantity of the powder mix from the hopper through the outlet. A whipping chamber is disposed between and in communication with the hopper outlet and the bowl. The whipping chamber, unlike the mixing chambers of the prior art, has a mechanical impeller contained therein. A water supply in selective communication with the whipping chamber via a water control valve, preferably through a water cup, supplies a metered quantity of water to the whipping chamber.

A probe extends into the bowl and measures the quantity of mixed beverage in the bowl. A control circuit, upon sensing a quantity of mixed beverage in the bowl below a predetermined quantity, automatically activates the hopper agitator, opens the water control valve and activates the impeller in the whipping chamber. The powder beverage mix and water are substantially completely mixed into a homogenous beverage mixture having a predetermined consistency prior to passage of the beverage mixture to the bowl. This mixing process occurs until the quantity of mixed beverage in the bowl rises to a predetermined quantity.

A magazine of sanitizing tablets arranged in a stack is also provided on the housing proximate a sanitizing tablet opening extending through the housing for allowing sanitizing tablets to pass into the bowl. At the completion of the day, the operator drains the bowl of any remaining beverage and then activates the cleaning switch. The bowl is filled with a fresh water and then drained. Again, the bowl begins to fill with fresh water. However, a sanitizer solenoid is also activated upon the initiation of the second fill, pushing a sanitizer tablet into the fresh water where it dissolves and sanitizes the water and bowl. The bowl is again emptied, the rinse button is again depressed to rinse the bowl of any debris, and the machine is ready for service the next day.

As will appear from the detailed description of the preferred embodiment to follow, the features of the beverage supply apparatus render it suitable for a wide variety of conditions and uses. In addition to the convenience of automatically maintaining a predetermined quantity of premixed beverage ready to be dispensed from the dispenser at all times, the premixed beverage remains substantially at the properly chilled temperature and consistency throughout the day. Also, since human intervention by premixing the beverage in a separate mixing container is completely avoided, significant safety and health benefits are obtained from the present invention.

The above brief description sets forth rather broadly the more important features of the present disclosure so that the detailed description that follows may be better understood, and so that the present contributions to the art may be better appreciated. There are, of course, other features of the disclosure that will be described hereinafter which will form the subject matter of the claims appended hereto.

In this respect, before explaining the several preferred embodiments of the disclosure in detail, it is to be understood that the disclosure is not limited in its application to the details of the construction and the arrangements set forth in the following description or illustrated in the drawings. The beverage supply apparatus of the present disclosure is capable of other embodiments and of being practiced and carried out in various ways. Also, it is to be understood that the phraseology and terminology employed herein are for description and not limitation. Where specific dimensional and material specifications have been included or omitted from the specification or the claims, or both, it is to be understood that the same are not to be incorporated into the appended claims.

As such, those skilled in the art will appreciate that the conception, upon which this disclosure is based, may readily be used as a basis for designing other structures, methods, and systems for carrying out the several purposes of the present invention. It is important, therefore, that the claims are regarded as including such equivalent constructions as far as they do not depart from the spirit and scope of the present invention.

Further, the purpose of the Abstract is to enable the U.S. Patent and Trademark Office and the public generally, and especially the scientists, engineers and practitioners in the art who are not familiar with the patent or legal terms of phraseology, to learn quickly from a cursory inspection the nature and essence of the technical disclosure of the application. Accordingly, the Abstract is intended to define neither the invention nor the application, which is only measured by the claims, nor is it intended to be limiting as to the scope of the invention in any way.

The objects of the instant invention, along with the various features and structures that characterize the invention, are pointed out with particularity in the claims annexed to and forming a part of this disclosure. For a better understanding of the beverage supply apparatus of the present disclosure, its advantages and the specific objects attained by its uses, reference should be had to the accompanying drawings and descriptive matter in which there are illustrated the preferred embodiment of the invention.

BRIEF DESCRIPTION OF THE DRAWINGS

The disclosure of the beverage supply apparatus is explained with an illustrative embodiment shown in the accompanying drawing, where.

DETAILED DESCRIPTION OF THE PREFERRED EMBODIMENT

Figure 1:
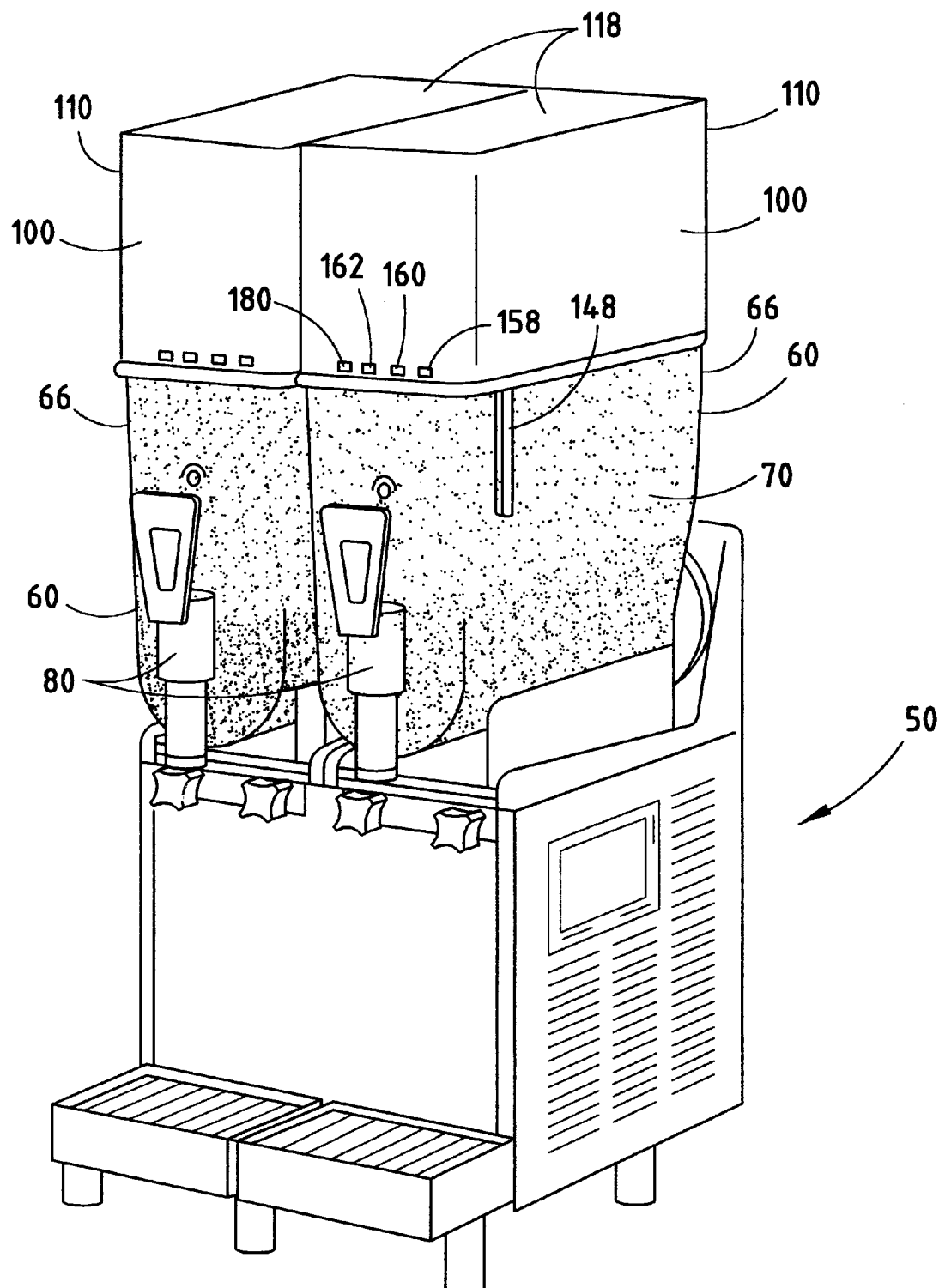
FIG. 1 is a perspective view of an iced beverage dispenser upon which the improved apparatus for supplying a mixed beverage to an iced beverage dispensing machine has been placed according to the present invention.

The best mode for carrying out the invention is presented in terms of the preferred embodiment, wherein similar reference characters designate corresponding features throughout the several figures of the drawings. As used herein, the term "iced beverage dispenser," whether singular or plural, is intended to refer to, and to be used interchangeably with, a dispenser capable of dispensing a chilled or cooled liquid or flowable beverage from a hopper storing a mass of premixed beverage into a customer's cup.

Figures 2, 3, 4:
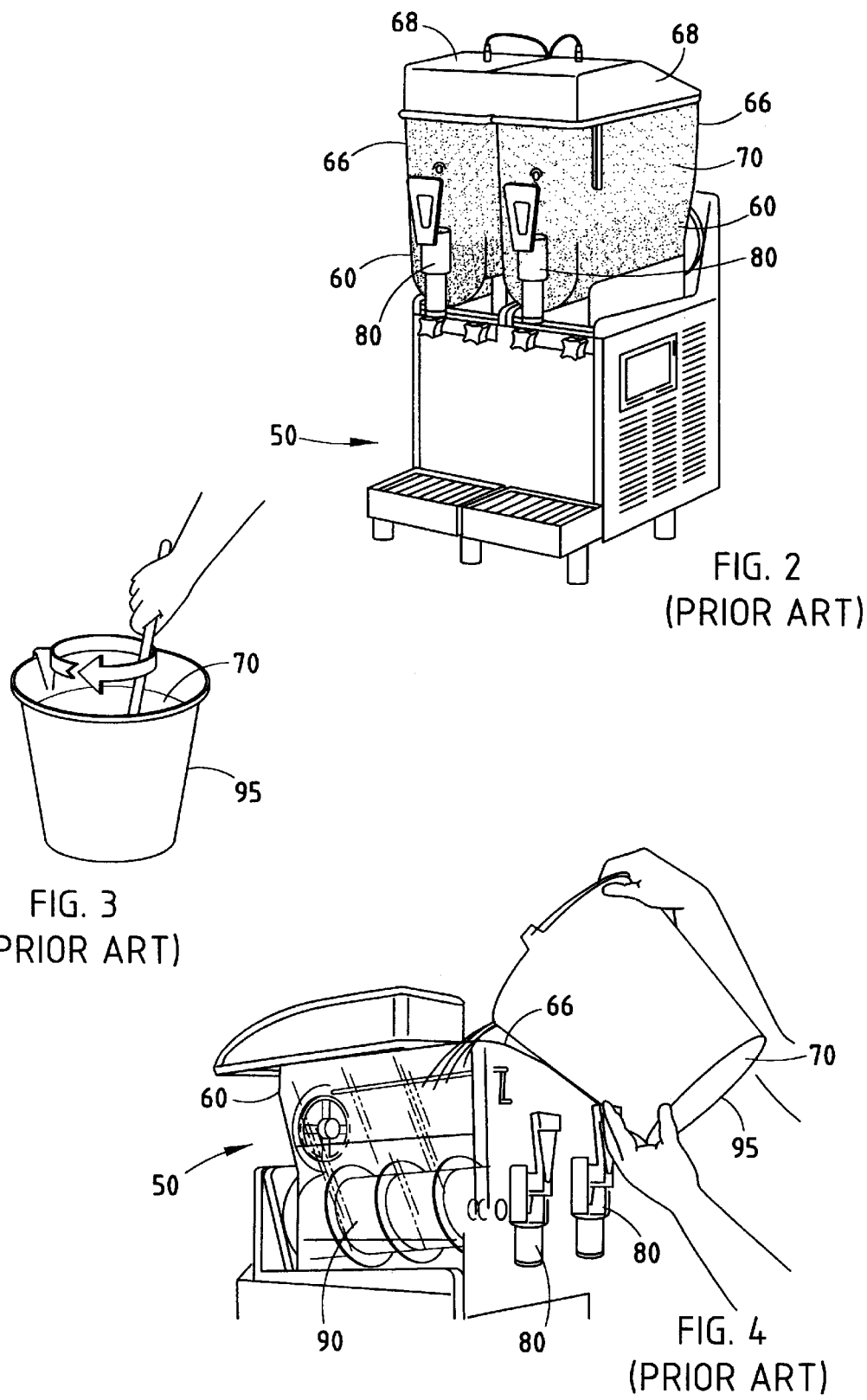
FIG. 2 is a perspective view of an iced beverage dispenser of the prior art.
FIG. 3 is a perspective view of the iced beverage being premixed according to the prior art.
FIG. 4 is a perspective view of the premixed iced beverage being added to the iced beverage dispenser of the prior art.

Referring now to the drawings, particularly FIG. 1, there is shown an overall perspective view of an iced beverage dispenser 50 upon which the improved apparatus 100 for supplying a mixed beverage to an iced beverage dispensing machine has been placed according to the present invention. As is known in the art and further shown in FIGS. 2 and 4, iced beverage dispensers 50 typically include a bowl 60 for storing a quantity of mixed beverage 70, where the bowl 60 has an upper lip 66 to which is attached a cover 68, which is often illuminated and illustrated to serve a merchandising function. The iced beverage dispenser 50 is provided with a beverage dispensing valve 80 for drawing the beverage into a customer's cup. An auger 90, best shown in FIG. 4, is typically used to maintain the beverage within the bowl 60 in a mixed homogenous state. Particularly in the case of frozen or slushy beverages, the auger 90 is often combined with a cooling element, such as an evaporator coil, connected to a mechanical refrigeration system (not shown) to withdraw heat from the beverage and maintain its cold temperature.

To fill the iced beverage dispenser 50, a measured quantity of dry beverage powder is added to a separate container 95, diluted with water and mixed according to the manufacturer's directions in the separate container, as shown in FIG. 3. Once mixed, the beverage is poured over the upper lip 66 and into the bowl 60, as shown in FIG. 4. The mechanical refrigeration system begins to chill the beverage.

Since it is important that the mixing and chilling operations occur significantly before the first beverage draw is expected, automating the system according to the present invention has been found to be extremely advantageous. Accordingly, the present invention is directed to an improved beverage supply apparatus 100 that is preferably designed to sit atop the beverage dispenser bowl 60 as an optional or after-market device. Since there currently exist thousands of the iced beverage dispensers 50 in service, the ability of the supply apparatus 100 to mount onto existing dispensers is important. Also, given the possibility for malfunction in any system, including that of the present invention, it is advantageous to be able to remove the supply apparatus 100 and return to the prior art method of premixing the beverage in a separate container 70 in an emergency.

Figure 5:
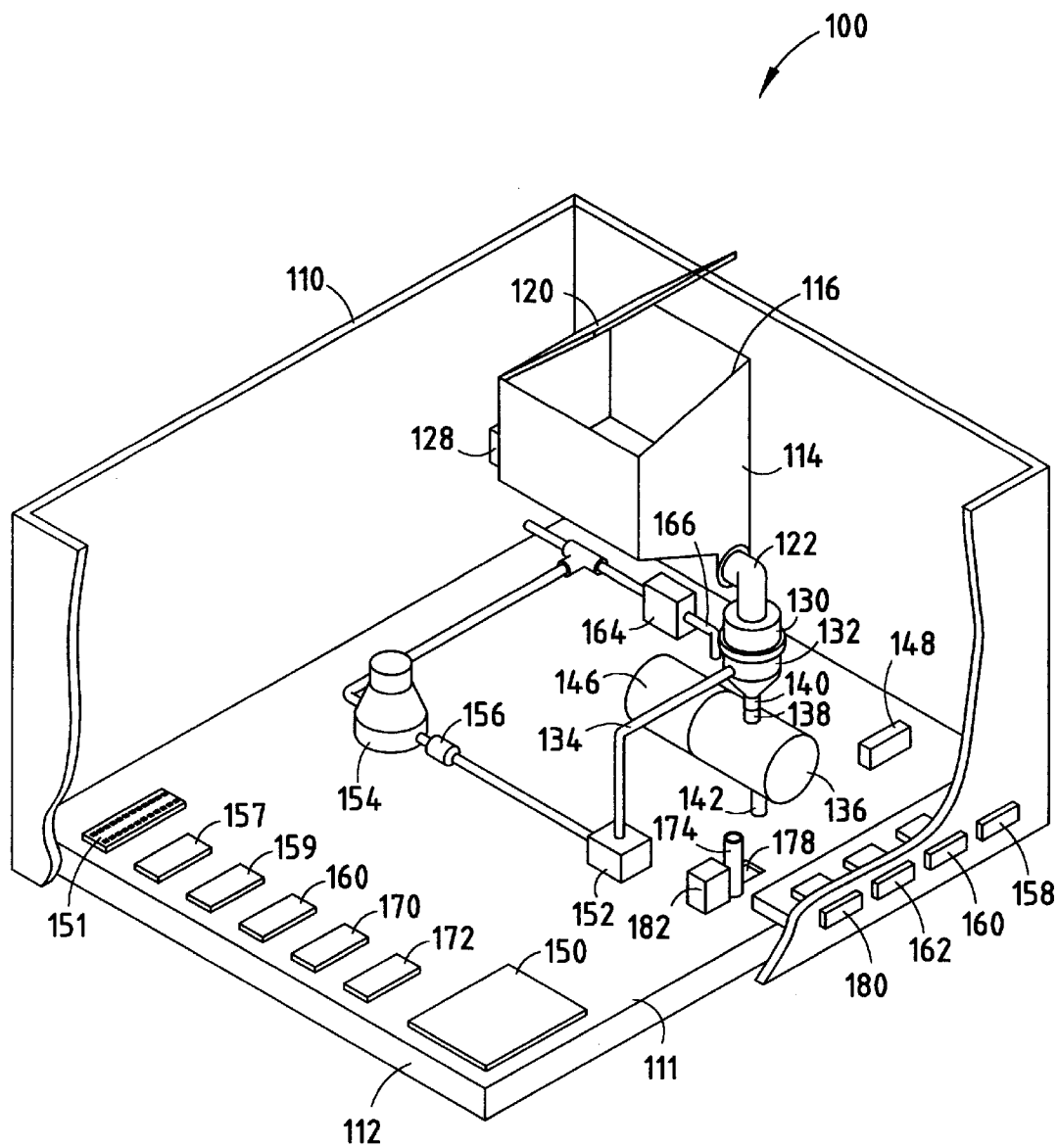
FIG. 5 is a perspective and partially cut-away view of the improved beverage supply apparatus for automatically supplying an iced beverage dispenser according to the present invention.

The supply apparatus 100 is preferably contained within a substantially rectangular shaped housing or enclosure 110, as shown in FIG. 5, fabricated from any of a number of different materials, including aluminum and plastic. In the present invention, it is preferred that the housing be fabricated from plastic, resulting in lower weight and easy attachment to and removal from the dispenser 50. The size of the housing 110 should be as small and compact as possible, but will vary in size depending on the specific manufacturer and model of the beverage dispenser 50. That is, it is desirable that the horizontal area and shape conform to that of the upper lip 66 of the bowl 60, even though this size and shape varies with manufacturer and model. Of course, it is contemplated that illuminated illustrations may be provided for merchandising purposes as is known in the art. A mounting flange 112, as is known in the art, is provided on the bottom housing 110 of the supply apparatus 100 to maintain a substantially sealed relation between the supply apparatus 100 and the upper bowl lip 66.

Within the housing 110 is disposed a hopper 114 for storing a mass of dry beverage powder mix. The hopper 114, preferably Model 220.2500GN by Componenti, sold through Vending Equipment Sales, Inc. of Minneapolis, Minn., has an upper opening 116 for readily admitting powder mix into the hopper 114 and preferably has at least one side sloping inwardly to urge the dry powder toward the bottom. In the preferred embodiment, an upper lid 118 is removed from the top of the supply apparatus 100 by the operator, exposing the hopper 114. A hinged lid 120 is opened, whereupon the operator adds the dry beverage powder mix. Preferably, the hopper 114 is sufficiently large to store 4 pounds of the dry beverage powder mix.

Figure 6:
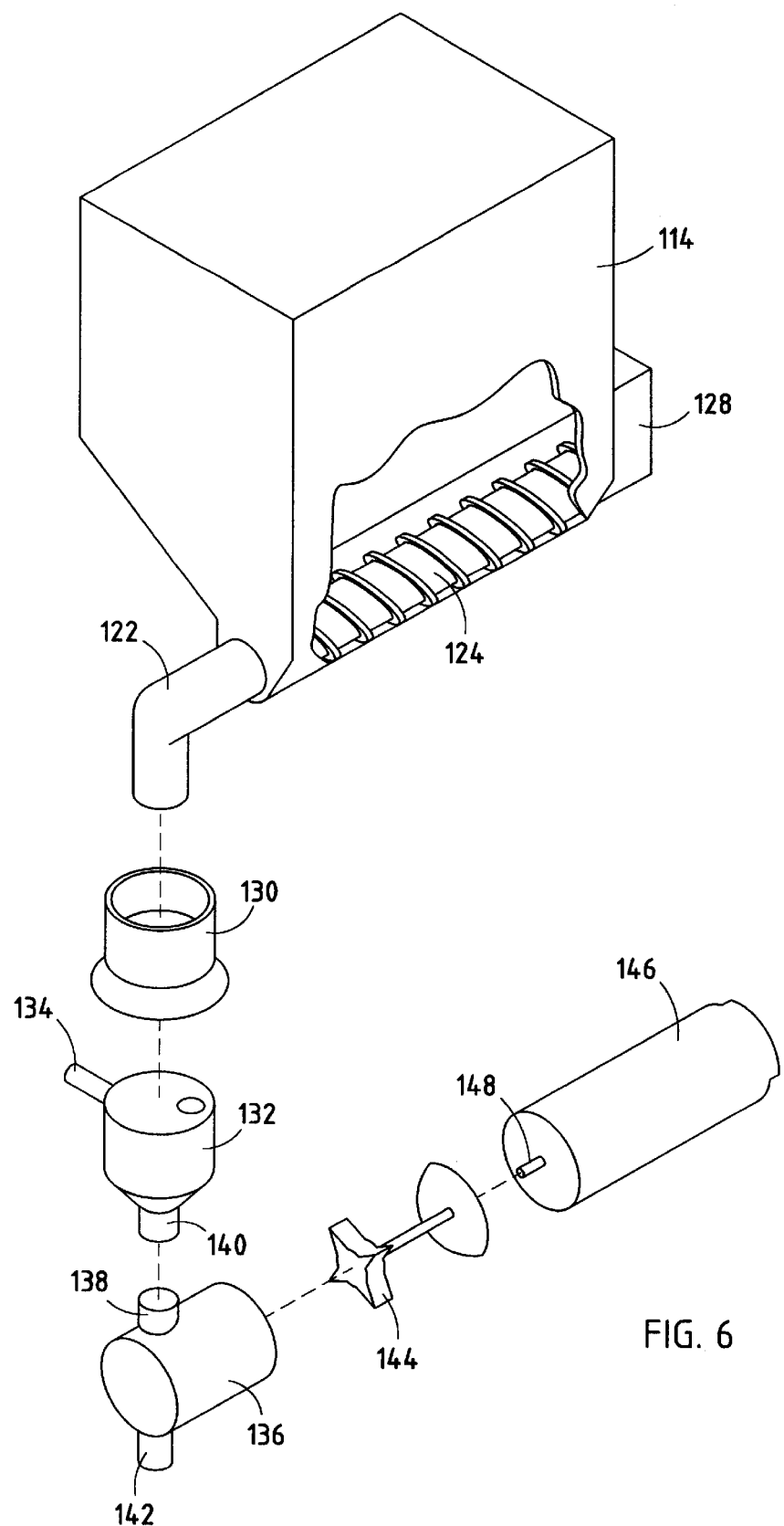
FIG. 6 is a perspective and partially away view of the hopper, water cup and whipping chamber of the improved beverage supply apparatus for automatically supplying an iced beverage dispenser according to the present invention.

The hopper also has an outlet 124 for dispensing powder mix from the hopper 114 and an auger 126, best shown in FIG. 6, for selectively feeding a metered quantity of the powder mix from the hopper 114 through the outlet 124. The auger 126 is selectively driven by auger motor 128, preferably Model 2611116G by Componenti, sold through Vending Equipment Sales, Inc. of Minneapolis. Preferably, a collar 130 and water cup 132 are positioned below the outlet 124 into which the dry beverage powder drops. A water line 134 is supplied by a cold water tap and cold water tangentially enters the water cup 132, imparting a vortex motion to the water and some of the beverage powder.

However, not all dry powder comes into contact with the cold water in the water cup 132. Even the powder that does come into contact with the cold water typically does not mix completely, particularly with high fatty solid content powders. Thus, the result is agglomerations of dry powder. To eliminate this drawback, a whipping chamber 136 is disposed between and in communication with the hopper outlet 122, collar 130 and water cup 132 and the bowl 60. The whipping chamber 136, preferably Model 101.0150A Corpo Mix 6 by Componenti, sold through Vending Equipment Sales, Inc. of Minneapolis, has an inlet 138 that is sealingly engaged by water cup outlet 140 and an outlet 142. Whipping chamber outlet 142, as shown in FIG. 5, directly exhausts through the housing floor 111 into the bowl 60.

Unlike the so-called "mixing" chambers of the prior art, the whipping chamber 136 is critical and is provided with a mechanical impeller 144 disposed within the whipping chamber 136 driven by a high speed whipper motor 146 via a shaft 148. The whipper motor is preferably Model LD 15L 1002 by Componenti, sold through Vending Equipment Sales, Inc. of Minneapolis. As the agglomerations of dry powder and water enter the whipping chamber 136, the impeller 144 is rotated at approximately 10,000 rpm. The vigorous whipping action instantly dissolves the water and the powder mix into a completely dissolved or mixed mixture having a homogenous composition, which is easily mixed into the frozen or to be frozen mixed beverage already in the bowl 60.

Figure 7:
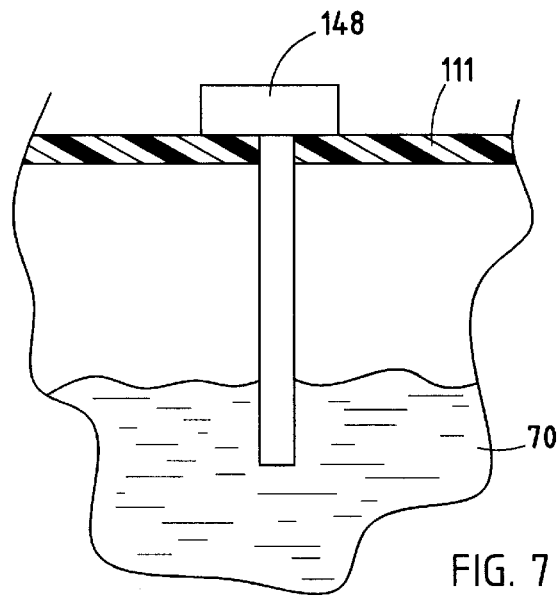
FIG. 7 is a cross-sectional view of the level probe of the improved beverage supply apparatus for automatically supplying an iced beverage dispenser according to the present invention.
Figure 8:
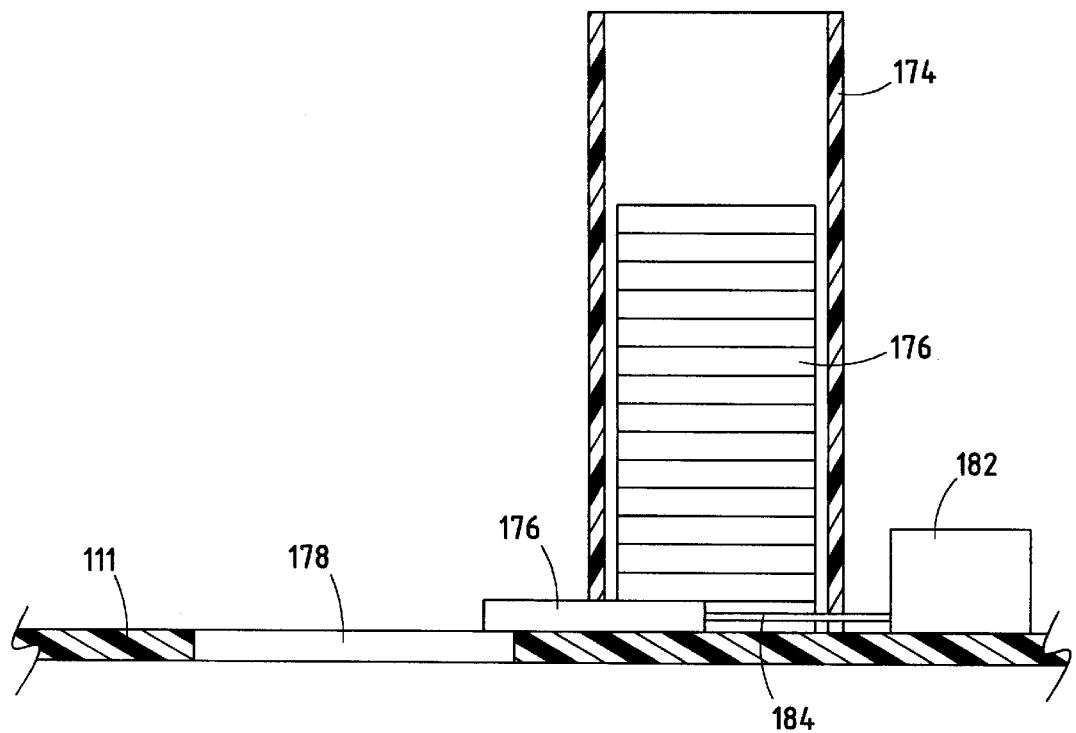
FIG. 8 is a cross-sectional view of the automatic sanitizing assembly of the improved beverage supply apparatus for automatically supplying an iced beverage dispenser according to the present invention.
Figure 9:
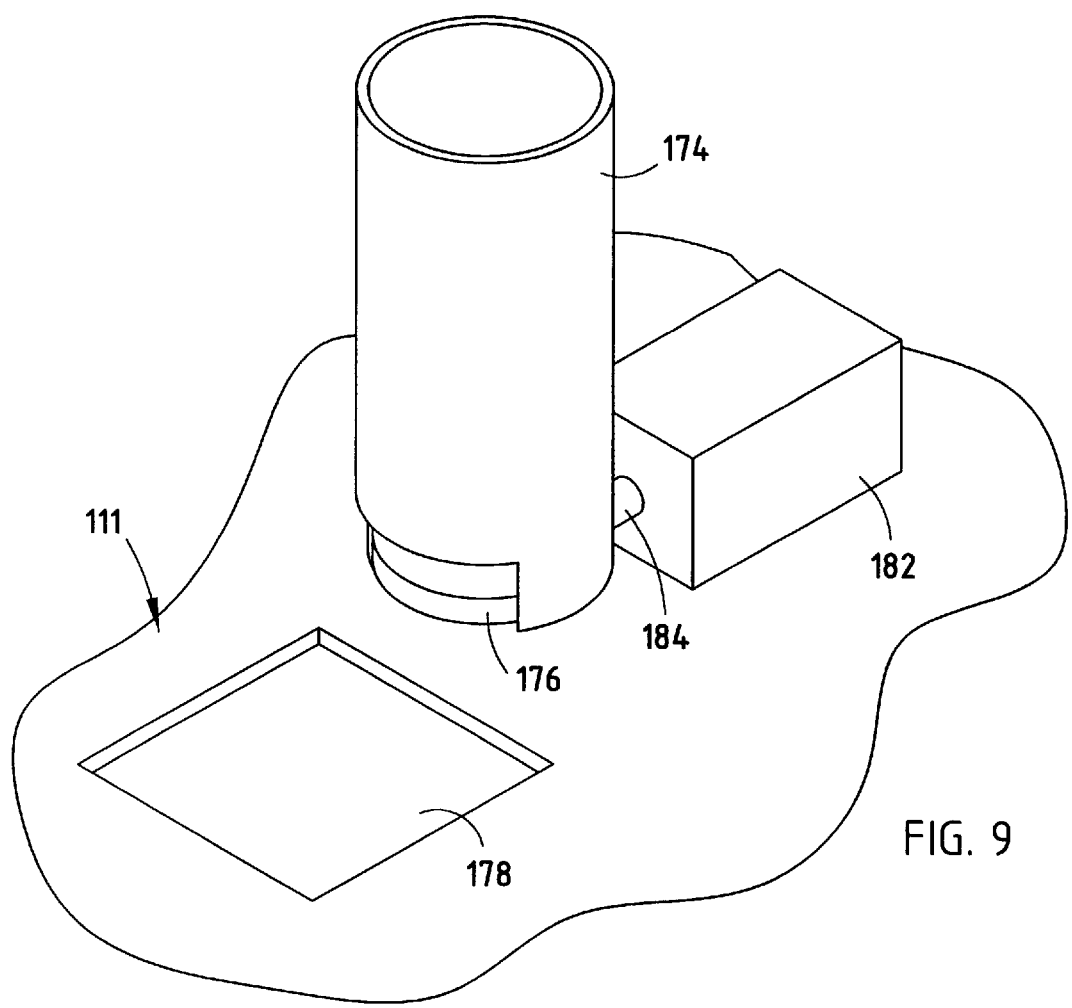
FIG. 9 is a perspective view of the automatic sanitizing assembly of the improved beverage supply apparatus for automatically supplying an iced beverage dispenser according to the present invention.

A probe 148, preferably Model No. 5 by Cleland, extends into the bowl 60 to constantly measure the quantity of mixed beverage in the bowl 60, as shown in FIG. 7. A control circuit 150, preferably comprising a Potter DPDT Relay by Brumfield, Potter 8 Pin Relay Block by Brumfield and Probe Control Board Model 6317 by Cleland, upon sensing the quantity of mixed beverage in the bowl to be below a predetermined quantity, automatically activates the hopper agitator motor 128, opens a make-up water valve 152 and activates the mechanical impeller 144 in the whipping chamber 136. Make-up water control valve 152 is preferably Model K-63314-51 by Eaton. The water to the make-up water control valve 152 first passes through a water pressure regulator 154 and flow control 156 to that the amount of water entering the water cup 130 is solely determined by the amount of time the make-up water valve 152 remains open, regardless of fluctuations in the system water line delivery pressure. Water pressure regulator 154 is preferably Model 612N by Arrow and flow control 156 is obtainable from Cleland, in California.

Figure 10:
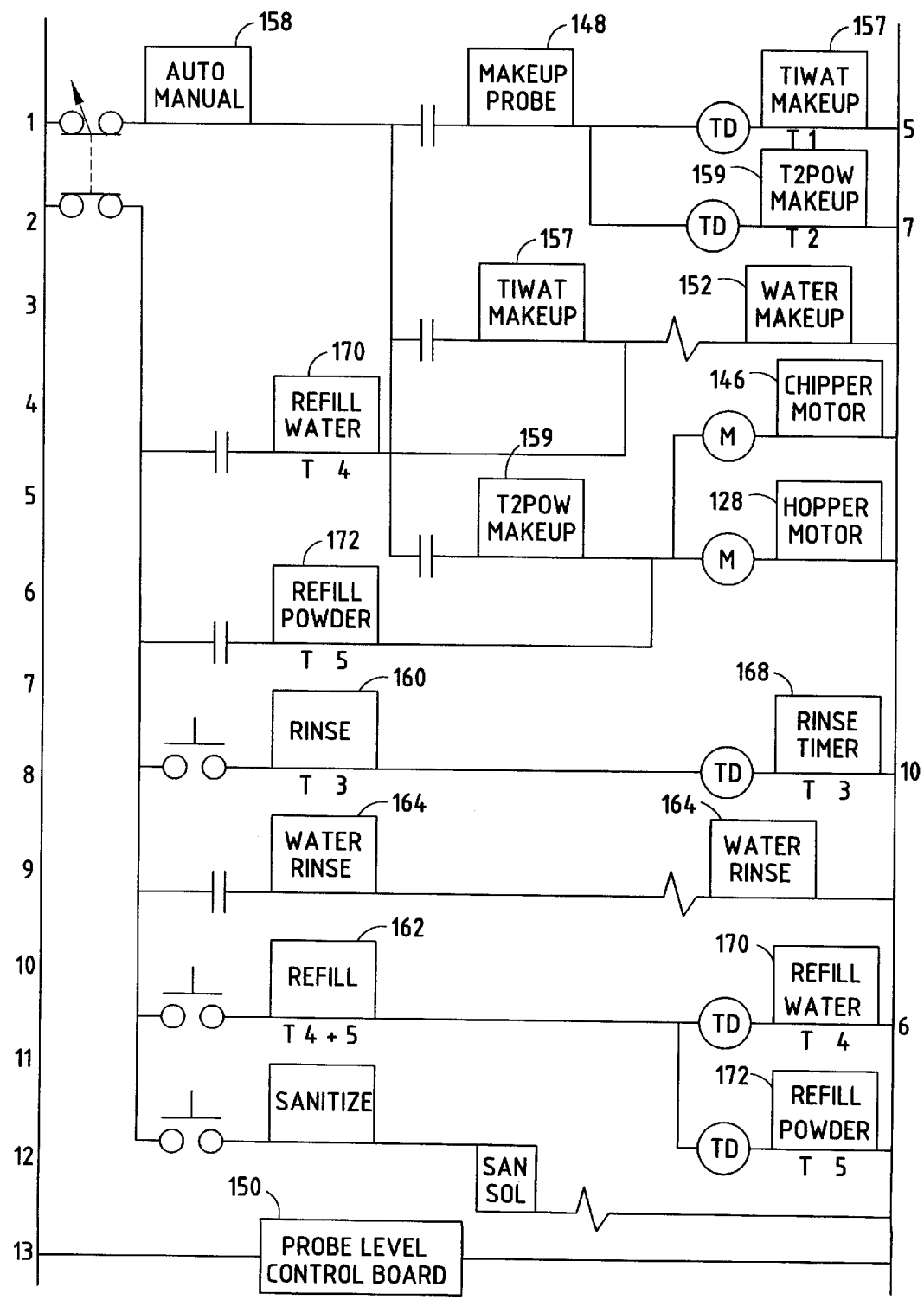
FIG. 10 is a wiring diagram for the improved beverage supply apparatus for automatically supplying an iced beverage dispenser according to the present invention.

A selectable auto/manual switch 158, preferably Model DPDT DSW 32 by GB, is provided on the front panel of the supply apparatus 100. It is preferably illuminated when activated to the automatic position. The circuit is shown in wiring diagram form in FIG. 10 and, like the other electrical components, is connected with terminal strip 151 for various necessary connections. When in the automatic position, the control circuit places the probe 158 in control of the operation of the hopper motor 128, whipper motor 146 and make-up water valve 152. That is, upon sensing a predetermined level deemed to be low enough to add more beverage yet not so low that the additional beverage will significantly increase the temperature of the beverage already in the bowl 60, preferably less than 5 percent of the bowl capacity, powder and water are added to the water cup 132 and mixed completely in the whipping chamber 136 before passing to the bowl 60. This occurs until the make-up water valve timer 157 closes the make-up water valve 152 and motor timer 159 deenergizes the hopper auger motor 128 and whipper motor 146. It is preferable that the make-up water valve 152 close just after the hopper auger motor 128 and whipper motor 146 are deenergized to avoid the whipping chamber impeller 144 rotating within the whipping chamber 136 without a liquid being present to avoid damage to the whipping chamber 136 and the impeller 144.

When the auto/manual switch 158 is in the manual position, the control circuit places system control with a rinse switch 160 and a refill switch 162. The rinse cycle allows the operator of the machine, at the end of the day and after draining the bowl 60 of any remaining beverage, to readily and easily rinse out the bowl 60 and the components contained therein. When the rinse switch 160, preferably mom push button Model GSW22 by GB, is actuated, the rinse cycle is initiated, refill/rinse water valve 164 is opened and fresh, unmixed water directly enters bowl 60 through floor 111 of the housing 110 through outlet 166 until rinse timer 168 signals the control circuit to close the refill/rinse water valve 164. Refill/rinse valve 164 is preferably Model K-63314-51 by Eaton.

As an additional feature of the present invention, a sanitizing function is possible. As noted above, there have long been problems with cleaning the bowls of iced beverage dispensers after use. To avoid cleaning the beverage dispenser and overcome the problem of the time required to do so every day and prospects for part loss or misplacement, a sanitizing tablet magazine 174 is provided. Sanitizing tablets 176 are arranged in a stack within the magazine 174 proximate a sanitizing tablet opening 178 extending through the housing floor 111 for allowing sanitizing tablets 176 to pass into the bowl 60.

At the end of the day, the operator drains the bowl 60 of any remaining beverage and then activates the rinse switch 160, which as noted above, starts the sequence for rinsing the unit. After the bowl 60 is filled and emptied of a predetermined quantity of fresh water, the operator again actuates the rinse switch 160 as well as a sanitizing switch 180. Again the bowl 60 begins to fill with fresh water. However, a sanitizer solenoid 182 is also activated upon the initiation of this second fill, causing plunger 184 to extend from the solenoid 82 and push the lowest of the sanitizer tablets 176, typically comprising powdered chlorine, in the magazine 174 over the sanitizing tablet opening 178, whereupon the sanitizing tablet 176 falls into the fresh water where it dissolves to sanitize the water and bowl 60. The bowl 60 is again emptied, rinsed again and is then ready for service the next day. Of course, weekly disassembly is still desired to fully clean all components of the machine, but the frequency of disassembly with its attendant drawbacks is dramatically reduced.

The refill cycle is used at the beginning of the day, with the unit previously rinsed and sanitized or cleaned from the previous day, to create and mix an entirely fresh bowl 60 of beverage. When the refill switch 162, preferably Model SPST BSW 11 by GB, is actuated the refill cycle is initiated. Here, make-up water valve 152 opens to admit water to the water cup 132, while hopper auger motor 128 and whipping chamber impeller motor 146 are energized, adding powder to the water cup 132 and combining the water and powder mix in the whipping chamber 136 to create a substantially completely mixed homogenous mixture, respectively, thereby directly adding fresh, substantially completely mixed beverage to bowl 60. This cycle continues until the bowl 60 is filled and controlled when refill timer 170 signals the control circuit 150 to close the make-up water valve 152 and refill timer 172 signals the control circuit 150 to deenergize the hopper auger motor 128 and whipper motor 146. The employ refills hopper 114 and can attend to other matters throughout the day, returning only periodically to add dry beverage powder only to the hopper 114 as needed. Preferably, the supply apparatus 100 of the present invention becomes inoperable if the hopper 114 is allowed to become empty. In this regard, it is contemplated that a low hopper level indicator may be provided to alert the employee of the need to add powder to the hopper 114.

Thus, as set forth above, the powder mix and water are substantially completely mixed into a homogenous beverage mixture having a predetermined consistency prior to passage of the beverage mixture to the bowl 60. This consistency is absolutely critical to the consumer acceptance and purchase of iced beverages and is controlled via timers 157 (in the automatic mode) and 170 (in the manual refill mode) that each control the make-up water valve 152. Due the pressure regulator 154 and flow control 156, the incoming water pressure is irrelevant. Only the amount of time that make-up water valve 152 is open is important. Thus, the ratio of water to powder mix can be precisely controlled to obtain a desired consistency at a given desired dispensing temperature. In contrast, the quantity of water entering the bowl 60 during the rinse cycle is not so critical, thereby allowing valve refill/rinse water valve 164 to remain unregulated.

Similarly, in the present invention, the mixing process occurs until the quantity of mixed beverage in the bowl rises to a predetermined quantity. As disclosed herein, this feature is obtained by operation of the various timers, preferably Model H3YN-2-12D by Omron. That is, by holding the valves open a preset time, a predetermined quantity of beverage can be knowingly and accurately added to the bowl 60. However, other methods could be used, such as using additional feedback signals from the probe 148 to indicate both low and high beverage level conditions, to advantageously practice the present invention.

The advantages of the disclosed beverage supply apparatus are attained in an economical, practical and facile manner. To wit, a automated beverage supply apparatus for automatically providing a substantially mixed homogenous beverage to a beverage dispenser has been developed.

While embodiments of the supply apparatus have been herein illustrated and described, it is to be appreciated that various changes, rearrangements and modifications may be made therein, without departing from the scope of the invention as defined by the appended claims.

What is claimed:

1. An apparatus for automatically supplying a substantially mixed homogenous beverage to a beverage dispenser having a bowl for storing a quantity of mixed beverage having an upper lip, the supply apparatus comprising:

a housing having a mounting flange for mounting the supply apparatus to the upper lip of the bowl;

a hopper within the housing for storing a mass of dry beverage powder mix having an upper opening for admitting powder mix into the hopper, a hopper outlet for dispensing powder mix from the hopper and a hopper auger for selectively feeding a metered quantity of the powder mix from the hopper through the outlet;

a whipping chamber disposed between and in communication with the hopper outlet and the bowl, the whipping chamber having a mechanical impeller contained therein;

a water supply line in selective communication with the whipping chamber via a water control valve for supplying a metered quantity of water to the whipping chamber;

a probe extending into the bowl for measuring the quantity of mixed beverage in the bowl;

a sanitizing magazine containing a quantity of sanitizing tablets, a movable plunger proximate the magazine and a passage from the magazine to the bowl, wherein a sanitizing tablet can be added to the bowl by extending the plunger to move a tablet into the passage; and a control circuit in electrical communication with the probe that, upon sensing a quantity of mixed beverage in the bowl below a predetermined quantity, automatically activates the hopper auger, opens the water control valve and activates the mechanical impeller in the whipping chamber to substantially completely mix the powder mix and water entering the whipping chamber into a homogenous beverage mixture having a predetermined consistency prior to passage of the beverage mixture to the bowl until the quantity of mixed beverage in the bowl rises to a predetermined quantity.

2. An apparatus for automatically supplying a substantially mixed homogenous beverage to a beverage dispenser having a bowl for storing a quantity of mixed beverage having an upper lip, the supply apparatus comprising:

a housing having a mounting flange for mounting the supply apparatus to the upper lip of the bowl;

a hopper within the housing for storing a mass of dry beverage powder mix having an upper opening for admitting powder mix into the hopper, a hopper outlet for dispensing powder mix from the hopper and a hopper auger for selectively feeding a metered quantity of the powder mix from the hopper through the outlet;

a whipping chamber disposed between and in communication with the hopper outlet and the bowl, the whipping chamber having a mechanical impeller contained therein;

a water supply line in selective communication with the whipping chamber via a water control valve for supplying a metered quantity of water to the whipping chamber;

a probe extending into the bowl for measuring the quantity of mixed beverage in the bowl;

a selectable auto/manual switch having a first position for selectively allowing the control circuit to control operation of the hopper auger to add powder to the whipping chamber, the water supply line to add water to the whipping chamber and the whipping chamber impeller to mix the powder mix and water automatically upon the probe sensing a predetermined level of mixed beverage in the bowl and a second position for manual operation only; and a control circuit in electrical communication with the probe that, upon sensing a quantity of mixed beverage in the bowl below a predetermined quantity, automatically activates the hopper auger, opens the water control valve and activates the mechanical impeller in the whipping chamber to substantially completely mix the powder mix and water entering the whipping chamber into a homogenous beverage mixture having a predetermined consistency prior to passage of the beverage mixture to the bowl until the quantity of mixed beverage in the bowl rises to a predetermined quantity, the control circuit further comprising a rinse switch that, when actuated with the auto/manual switch in the second position, opens a second water supply line to add fresh water only to the bowl until the bowl is substantially filled.

3. The supply apparatus according to claim 2, further comprising a sanitizing magazine containing a quantity of sanitizing tablets, a movable plunger proximate the magazine and a passage from the magazine to the bowl, wherein a sanitizing tablet is added to the bowl during the addition of fresh water only to the bowl.

4. A method for automatically supplying a substantially mixed homogenous beverage to a beverage dispenser having a bowl for storing a quantity of mixed beverage and having an upper lip, the method comprising the steps of:

placing a mass of dry beverage powder mix within a hopper located within a housing mounted on the upper lip of the bowl, the hopper having an upper opening for admitting powder mix into the hopper, an outlet for dispensing powder mix from the hopper and an auger for selectively feeding a metered quantity of the powder mix from the hopper through the outlet;

monitoring the quantity of mixed beverage in the bowl;

automatically activating the hopper auger when the quantity of mixed beverage in the bowl falls below a predetermined quantity to convey powder beverage mix into a whipping chamber having a mechanical impeller and a second water supply in selective communication with the whipping chamber via a water control valve for supplying a metered quantity of water to the whipping chamber;

opening the water control valve and activating the mechanical impeller in the whipping chamber to substantially completely mix the powder beverage mix and water entering the whipping chamber into a homogenous beverage mixture having a predetermined consistency prior to passage of the beverage mixture to the bowl until the quantity of mixed beverage in the bowl rises to a predetermined quantity; further including the steps of selecting a manual mode of operation for the supply apparatus via an auto/manual switch having a first position for automatic operation and a second position for manual operation;

draining the bowl of any beverage contained therein;

rinsing the bowl by actuating a rinse switch that, when actuated with the auto/manual switch in the second position, opens a water supply line to add fresh water to the bowl until the bowl is substantially filled;

draining the bowl of any rinse water contained therein;

rinsing the bowl again by actuating the rinse switch to add fresh water to the bowl until the bowl is substantially filled;

substantially simultaneously actuating a movable plunger proximate a magazine of sanitizing tablets to move a sanitizing tablet into a passage from the magazine to the bowl, wherein the sanitizing tablet is added to the bowl during the addition of fresh water only to the bowl;

rinsing the bowl again by actuating the rinse switch to add fresh water to the bowl until the bowl is substantially filled; and draining the bowl of any rinse water contained therein.

* * * * *